United States Patent
Kobayashi et al.

(10) Patent No.: US 7,710,592 B2
(45) Date of Patent: May 4, 2010

(54) STORAGE MEDIUM FOR MANAGING JOB LOG, JOB LOG MANAGEMENT METHOD, IMAGE PROCESSING APPARATUS, AND IMAGE PROCESSING SYSTEM

(75) Inventors: Yujiro Kobayashi, Kanagawa (JP); Masafumi Ono, Kanagawa (JP); Toshiaki Arai, Kanagawa (JP); Kazuko Kirihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 994 days.

(21) Appl. No.: 11/452,315

(22) Filed: Jun. 14, 2006

(65) Prior Publication Data
US 2007/0133054 A1    Jun. 14, 2007

(30) Foreign Application Priority Data
Dec. 13, 2005  (JP)  .............. 2005-359211

(51) Int. Cl.
*G06K 15/00* (2006.01)
*H04N 1/40* (2006.01)

(52) U.S. Cl. .................... 358/1.16; 358/3.23

(58) Field of Classification Search ........... 358/1.16, 358/524, 404, 444, 426.05, 1.17, 3.23, 443, 358/448; 399/10; 714/20; 382/305
See application file for complete search history.

(56) References Cited

U.S. PATENT DOCUMENTS

| | | | |
|---|---|---|---|
| 6,856,414 B1 * | 2/2005 | Haneda et al. | 358/1.15 |
| 2004/0056973 A1 * | 3/2004 | Takaiwa et al. | 348/333.01 |
| 2007/0016029 A1 * | 1/2007 | Donaldson et al. | 600/437 |
| 2007/0019810 A1 * | 1/2007 | Suzue | 380/203 |
| 2007/0044013 A1 * | 2/2007 | Hyatt | 715/515 |
| 2007/0046969 A1 * | 3/2007 | Shinchi et al. | 358/1.13 |

FOREIGN PATENT DOCUMENTS

| | | |
|---|---|---|
| JP | A-2004-078638 | 3/2004 |
| JP | A-2004-102549 | 4/2004 |
| JP | A 2004-192273 | 7/2004 |
| JP | 2005241791 * | 3/2009 |
| JP | 2007166176 * | 6/2009 |
| JP | 2007166178 * | 6/2009 |

\* cited by examiner

*Primary Examiner*—Jerome Grant, II
(74) *Attorney, Agent, or Firm*—Oliff & Berridge, PLC

(57) ABSTRACT

A storage medium is readable by a computer. The storage medium stores a program of instructions executable by the computer to perform a function for managing a job log. The function includes: creating a job log after execution of a job; generating a log image from an image handled by the job; and storing the log image in association with the job log.

18 Claims, 8 Drawing Sheets

FIG. 7

| SPECIFIED RESOLUTION | FAX DATA (200dpi) | BLACK-AND-WHITE DATA (600dpi) | COLOR SCANNING DATA (600dpi) |
|---|---|---|---|
| 25dpi | REDUCTION | REDUCTION | REDUCTION |
| 50dpi | REDUCTION | REDUCTION | REDUCTION |
| 72dpi | REDUCTION | REDUCTION | REDUCTION |
| 100dpi | COPYING OF ORIGINAL DATA | REDUCTION | REDUCTION |
| 200dpi | CONVERSION INTO GRAY SCALE DATA, EDGE EMPHASIS, SIZE CORRECTION | CONVERSION INTO GRAY SCALE DATA, EDGE EMPHASIS, SIZE CORRECTION | EDGE EMPHASIS, REDUCTION |

STORAGE MEDIUM FOR MANAGING JOB LOG, JOB LOG MANAGEMENT METHOD, IMAGE PROCESSING APPARATUS, AND IMAGE PROCESSING SYSTEM

CROSS-REFERENCE TO RELATED APPLICATIONS

This application is based on and claims the benefit of priority from the prior Japanese Patent Application No. 2005-359211, filed on Dec. 13, 2005; the entire contents of which are incorporated herein by reference.

TECHNICAL FIELD

The present invention relates to a storage medium for managing a job log, a job log management method, an image processing apparatus, and an image processing system which manage job log (i.e., a job execution record) of copy job, print job, scanning job, facsimile job, etc. after jobs are executed.

BACKGROUND

Related Art

Printing systems are known in which plural clients and a printer are connected to a LAN (local area network) and plural users can share the printer.

SUMMARY

A storage medium is readable by a computer. The storage medium stores a program of instructions executable by the computer to perform a function for managing a job log. The function includes: creating a job log after execution of a job; generating a log image from an image handled by the job; and storing the log image in association with the job log.

BRIEF DESCRIPTION OF THE DRAWINGS

These advantages of this invention will become more fully apparent from the following detailed description taken with the accompanying drawings in which:

FIG. 7 is for description of a log image generation method according to the second embodiment.

DESCRIPTION OF THE EMBODIMENTS

First Embodiment

Figure 1:
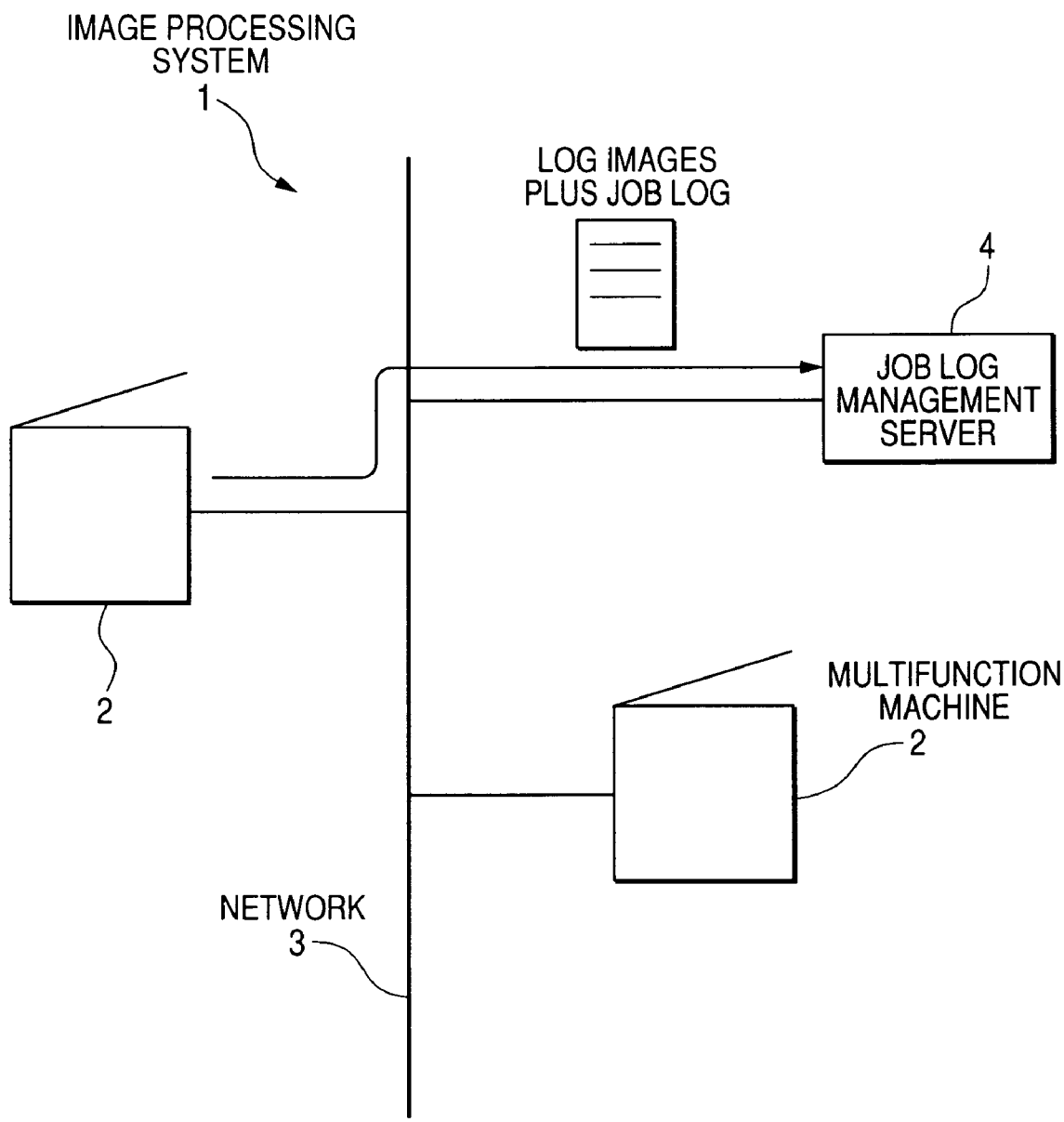
FIG. 1 shows the configuration of an image processing system according to a first embodiment of the present invention.

FIG. 1 shows an image processing system according to a first embodiment of the present invention. The image processing system 1 is provided with plural multifunction machines 2 as image processing apparatus and a job log management server 4. Each multifunction machine 2 carries out a job, generates its job log, and generates log images from images handled by the job. The job log management server 4 stores job logs and log images that are transferred from the multifunction machines 2 via a network 3.

Figure 2:
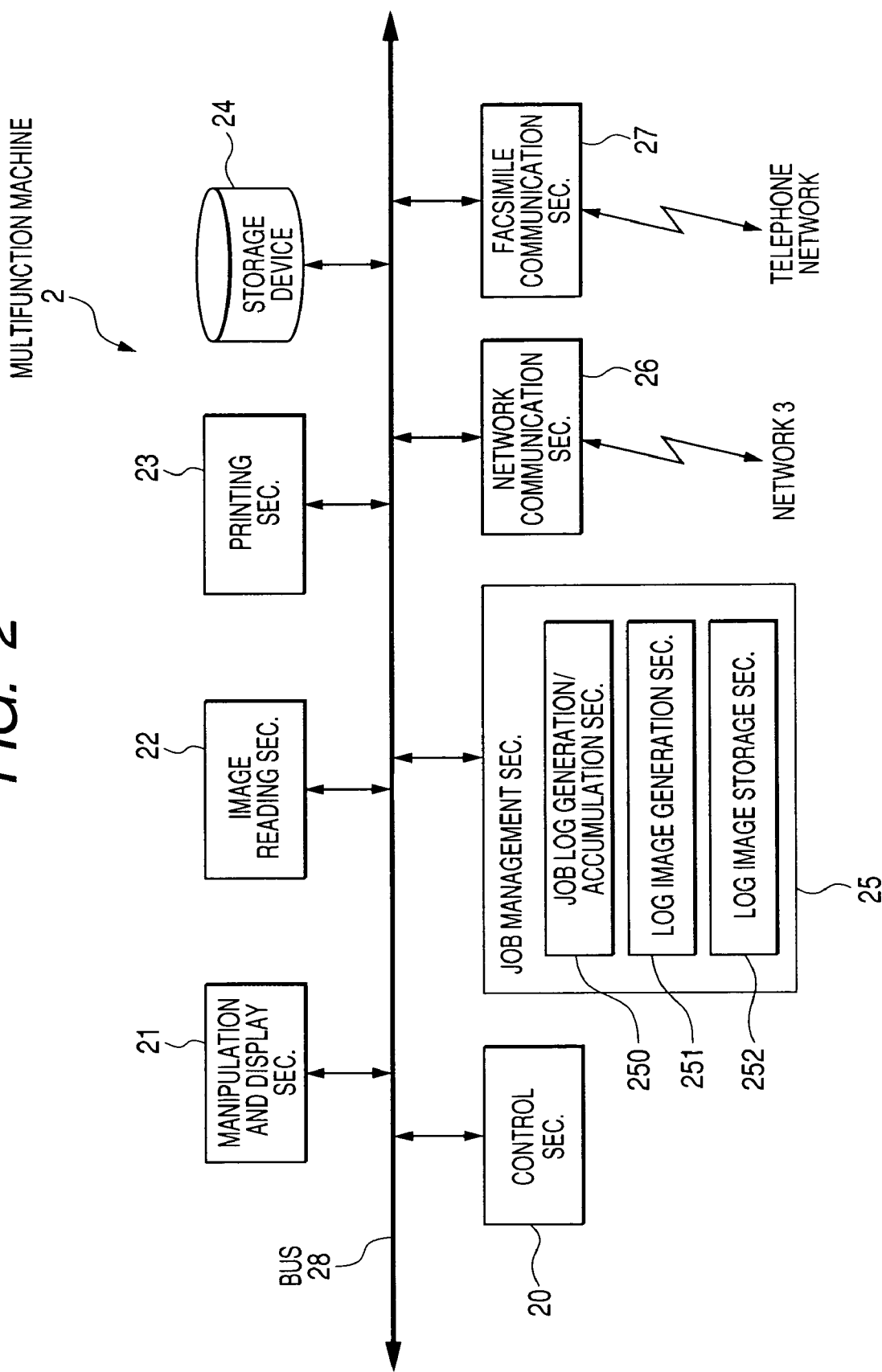
FIG. 2 is a block diagram of each multifunction machine according to the first embodiment.

FIG. 2 is a block diagram of each multifunction machine 2. The multifunction machine 2 is equipped with a control section 20 which is provided with a CPU, a ROM, a RAM, etc. and controls the individual sections of the multifunction machine 2, a manipulation and display section 21 which is provided with hard keys such as a start key and a touch panel display in which a touch panel is mounted on the surface of a display, an image reading section 22 which reads the image of a document sheet optically, a printing section 23 which prints an image on a sheet by electrophotography or the like, a storage device 24 such as an HDD which stores various kinds of information such as setting pictures, setting information, and images, a job management section 25 which receives a job, issues a multifunction machine ID and a job ID, and generates a job log etc. after execution of the job, a network communication section 26 which is connected to the network 3, and a facsimile communication section 27 which is connected to a telephone network or the like. The sections 21-27 are connected to each other via a bus 28.

The multifunction machine 2 has plural functions corresponding to copying, printing, scanning, facsimile, etc. A job processes an image using one or some of these plural functions. In this embodiment, a job is received by the manipulation and display section 21. However, a job may be received via a user terminal (not shown) such as a personal computer which is connected to the network 3.

Various programs such as job execution programs and a job log management program are stored in the ROM of the control section 20 and the storage device 24. The CPU of the control section 20 controls the individual sections of the multifunction machine 2 according to the programs stored in the ROM and the storage device 24.

The job management section 25 is equipped with a job log generation/accumulation section 250 which generates a job log after execution of a job and stores the job log, a log image generation section 251 which generates log images from images handled by a job, and a log image storage section 252 which stores log images in associated with a job log. The job management section 25 operates under the control of the CPU of the control section 20.

For example, a job log consists of a multifunction machine ID, a job ID, a job type, a user name, a job reception time, a job end time, status information such as job standby, job under processing, job stop, job completion, the number of output sheets, and an error type, and other information.

The log image generation section 251 generates a log image by processing an image handled by a job according to log image generation setting information. A log image generation method will be described later.

Figure 3:
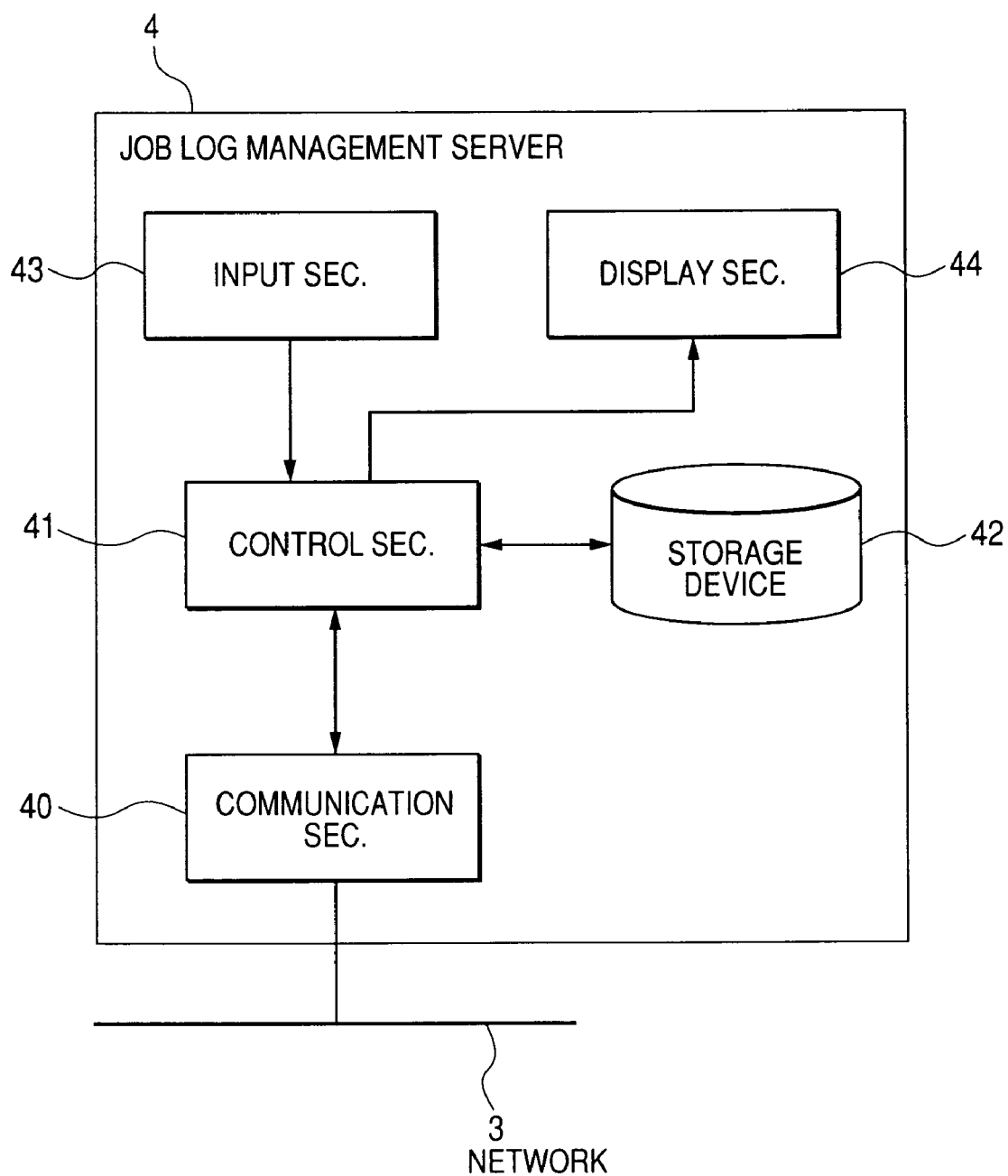
FIG. 3 is a block diagram of a job log management server according to the first embodiment.

FIG. 3 is a block diagram of the job log management server 4. The job log management server 4 has a communication section 40 which is connected to the network 3, a control section 41 which is equipped with a CPU, a ROM, a RAM, etc. and controls the individual sections of the server 4, a storage device 42 such as an HDD, an input section 43 which is equipped with a keyboard, a mouse, etc., and a display section 44 which displays a setting picture etc.

Various programs are stored in the ROM of the control section 41 and the storage device 42, and the CPU of the control section 41 controls the individual sections of the job log management server 4 according to the programs stored in the ROM and the storage device 42.

The storage device 42 stores log images and job logs that are transferred from the multifunction machines 2, setting pictures, etc. Log images are stored so as to be correlated with a job log.

Operation of First Embodiment

Next, the operation of this embodiment will be described for individual cases.

(1) Setting of Multifunction Machine by Manager

A manager of the system 1 or each multifunction machine 2 inputs a password by manipulating the manipulation and display section 21 of the multifunction machine 2. If the manager is authenticated as a regular one, a manager setting mode is established. The manager selects a "log image setting" button in a menu picture and thereby causes the manipulation and display section 21 to display a log image generation setting picture.

Figure 4:
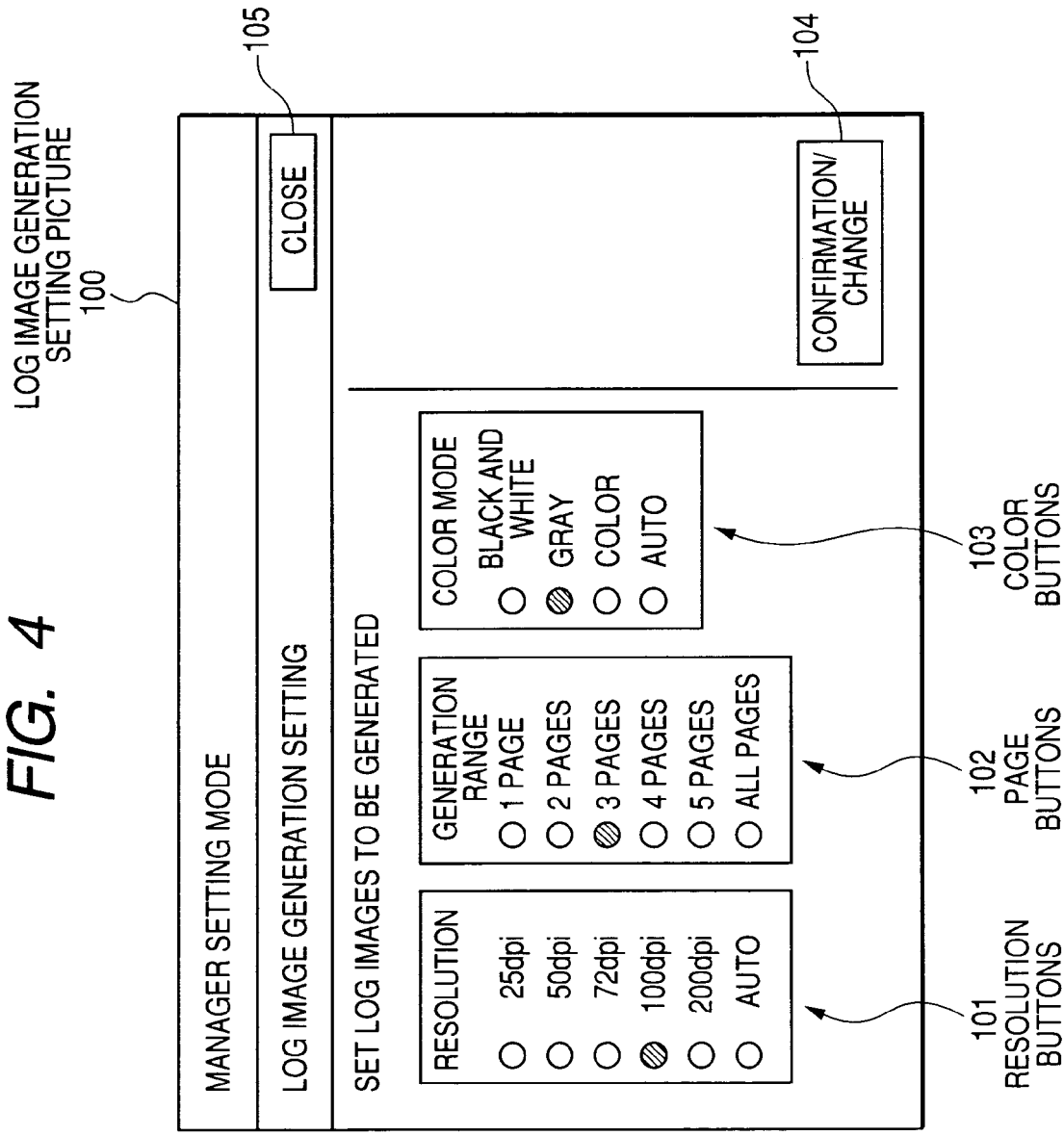
FIG. 4 shows a log image generation setting picture which is displayed in each multifunction machine according to the first embodiment.

FIG. 4 shows the log image generation setting picture. This picture 100 includes the following buttons. Resolution buttons 101 of "25 dpi," "50 dpi," "72 dpi," "100 dpi," "200 dpi," and "auto" are displayed for the resolution. Page buttons 102 of "1 page," "2 pages," "3 pages," "4 pages," "5 pages," "6 pages," and "all pages" are displayed for the log image generation range of images handled by a job. Color buttons 103 of "black and white," "gray," "color," and "auto" are displayed for the color mode. Other buttons of a "confirmation/change" button 104 for confirming or changing a setting (s) and a "close" button 105 for closing the log image generation setting picture 100 are also displayed.

The resolution buttons 101 of "25 dpi" to "200 dpi" are to specify a resolution of log images to be generated. The resolution button 101 of "auto" is to specify a resolution in accordance with an image type. For example, a high-resolution (e.g., 200 dpi or higher) log image is generated for a photograph image and a low-resolution (e.g., lower than 200 dpi) log image is generated for a text image.

The page buttons 102 of "1 page" to "6 pages" and "all pages" are to specify the number of pages starting from the first page for which log images should be generated. If the page button 102 of "all pages" is selected, the images of all pages will be made subjects of log image generation.

A generation range may be specified so that plural pages will be extracted randomly from all pages as subjects of log image generation. The random extraction prevents generation of log images from fixed-numbered pages, and hence makes it difficult for a malicious user to copy pages other than particular pages even if a generation range is specified. This provides the same effect of preventing information leakage, illegal copying, etc. as provided by generating log images for all pages. The number of pages to be extracted randomly may be set by a manager.

The color button 103 of "black and white" is to specify that a black-and-white log image and a color log image should be generated from a black-and-white image and a color image, respectively. The color button 103 of "gray" is to specify that a color image should be converted into a gray scale log image. The color button 103 of "color" is to give an instruction to generate a log image from a color image by decreasing the number of colors or to convert a black-and-white image into a two-color log image. The color button 103 of "auto" is to give an instruction to generate a log image by converting the color information of an image in accordance with its type.

The manager selects one button suitable for his or her intention from each of the set of resolution buttons 101, the set of page (generation range) buttons 102, and the set of color (color mode) buttons 103 and then depresses the "confirmation/change" button 104 in the log image generation setting picture 100. Finally, the manager depresses the "close" button 105 to close the log image generation setting picture 100, whereupon the settings made on the log image generation setting picture 100 become effective. The control section 20 stores the thus-determined log image generation setting information in the storage device 24 and causes a transition from the manager setting mode to an ordinary mode.

(2) Generation of Job Log and Log Images

If a user sets a job and gives an instruction to carry out the job by manipulating the manipulation and display section 21 of the multifunction machine 2, the control section 20 carries out the job by controlling the individual sections of the multifunction machine 2. When the job is started, the job management section 25 issues a multifunction machine ID and a job ID and starts to manage the job using the multifunction machine ID and the job ID. Alternatively, setting of a job and issuance of an instruction to carry out the job may be made from a user terminal that is connected to the network 3.

The job log generation/accumulation section 250 of the job management section 25 generates and stores a job log after the end of execution of the job. The log image generation section 251 generates log images by subjecting images handled by the job to image processing that conforms to the log image generation setting information that is stored in the storage device 24. For example, if images handled by the job are color images of plural pages and if the manager selected the resolution button 101 of "100 dpi," the page button 102 of "3 pages," and the color button 103 of "gray," the log image generation section 251 converts color images of the first to third pages among the plural pages into gray scale log images having the resolution 100 dpi. The selected buttons are hatched in FIG. 4. The job management section 25 stores the log images generated by the log image generation section 251 in the log image storage section 252 so as to be correlated with the job log.

(3) Transfer of Job Log and Log Images

The control section 20 transfers the job log and the log images to the job log management server 4 via the network communication section 26 and the network 3 with prescribed timing such as the end of the job. The control section 41 of the job log management server 4 receives, via the communication section 40, the job log and the log images that are transferred from the multifunction machine 2, and stores the job log and the log images in the storage device 42 in such a manner that they are correlated with each other. The job log and the log images will be used for job management by the manager.

Second Embodiment

Next, an image processing system according to a second embodiment of the invention will be described. The second embodiment is the same as the first embodiment in the diagram showing the configuration of the system 1 and the block diagram of each multifunction machine 2, and hence those drawings corresponding to the second embodiment are omitted.

Each multifunction machine 2 according to the second embodiment is configured in the same manner as that according to the first embodiment except that a use of log images is specified as part of log image generation setting information.

The job log management server 4 of this embodiment is configured in the same manner as that of the first embodiment except that it can perform character recognition (OCR) processing on a log image. Various programs such as a character recognition execution program and a search program for searching character recognition results are stored in the ROM of the control section 41. The CPU of the control section 41 controls the individual sections of the job log management server 4 according to the programs stored in the ROM and the storage device 42.

Figure 5:
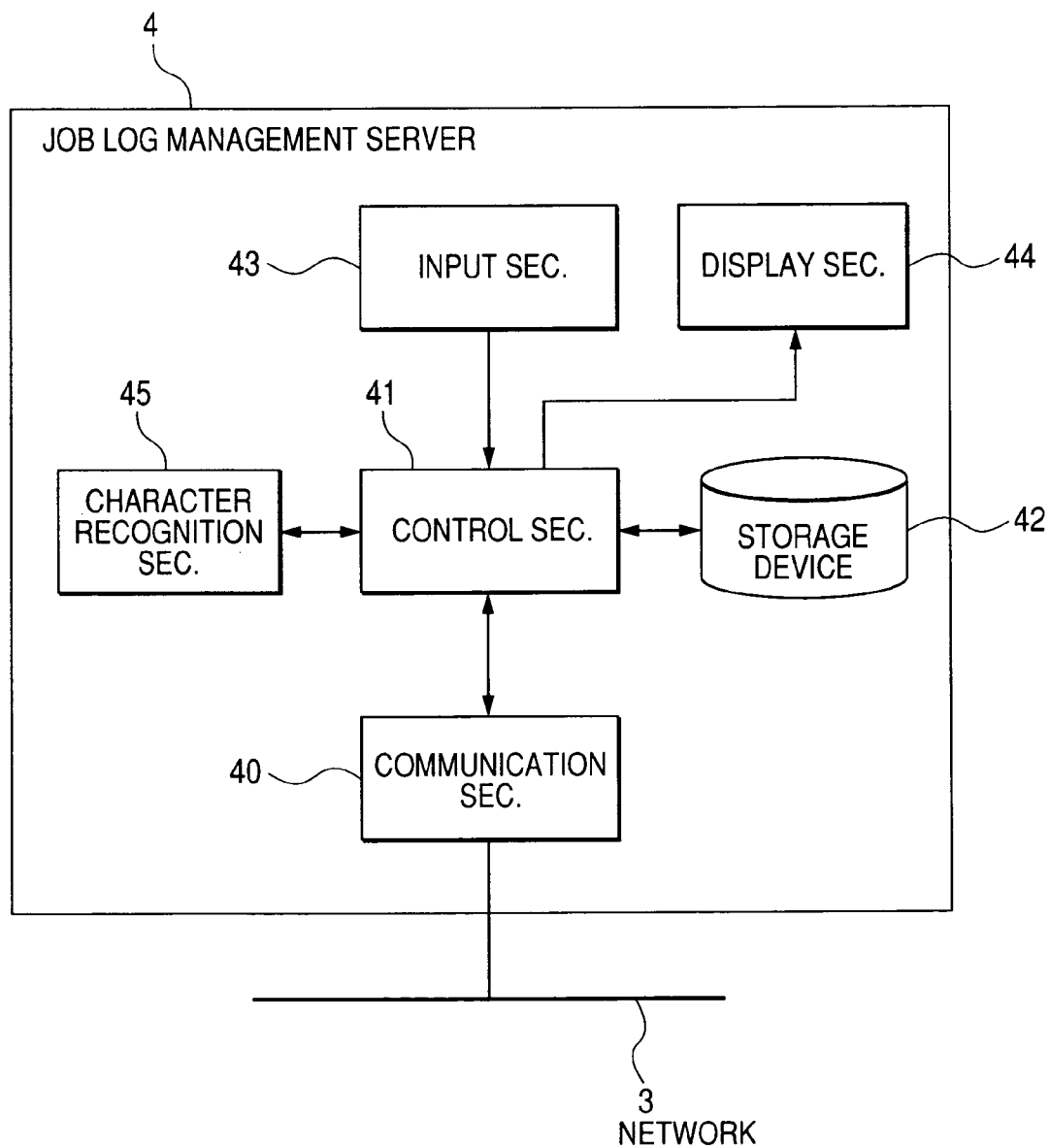
FIG. 5 is a block diagram of a job log management server according to a second embodiment of the invention.

FIG. 5 is a block diagram of the job log management server 4. This job log management server 4 is the same as the job log management server 4 of the first embodiment shown in FIG. 3 except that a character recognition section 45 is added. The character recognition section 45 character-recognizes log images designated by a manager by collating their character patterns with character patterns registered in a dictionary, and stores character recognition results in the storage device 42 in such a manner that they are correlated with a job log.

Operation of Second Embodiment

Next, the operation of this embodiment will be described for individual cases.

(1) Setting of Multifunction Machine by Manager

The manager inputs a password by manipulating the manipulation and display section 21 of the multifunction machine 2. If the manager is authenticated as a regular one, a manager setting mode is established. The manager selects a "log image setting" button in a menu picture and thereby causes the manipulation and display section 21 to display a log image generation setting picture.

Figure 6:
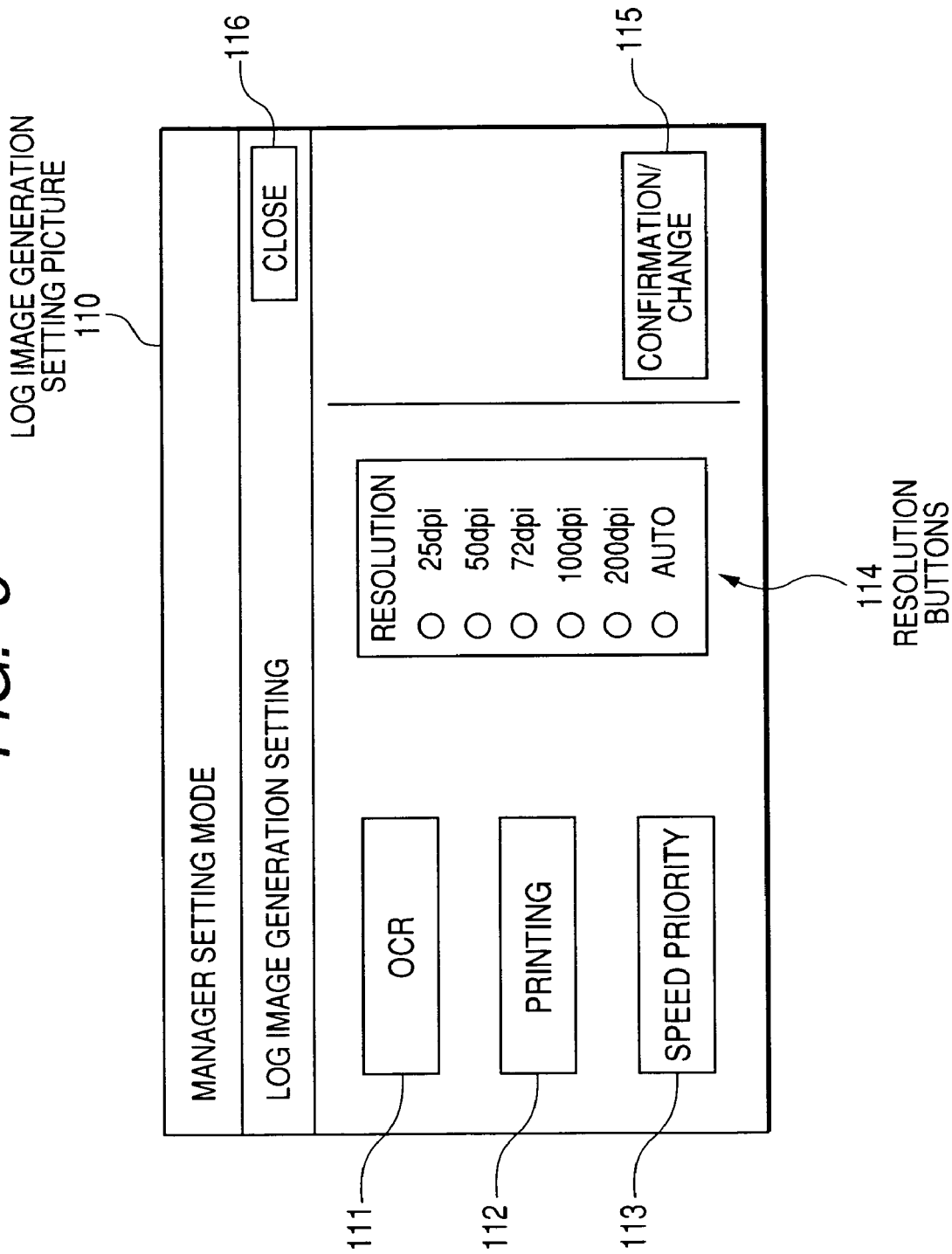
FIG. 6 shows a log image generation setting picture which is displayed in each multifunction machine according to the second embodiment.

FIG. 6 shows the log image generation setting picture. This picture 110 includes the following buttons. An "OCR" button 111 is displayed for issuance of an instruction to generate a log image for character recognition. A "printing" button 112 is displayed for issuance of an instruction to generate a log image for printing. A "speed priority" button 113 is displayed for issuance of an instruction to shorten the log image generation time. Resolution buttons 114 of "25 dpi," "50 dpi," "72 dpi," "100 dpi," "200 dpi," and "auto" are displayed to enable specification of a resolution. A "confirmation/change" button 115 for confirming or changing a setting(s) and a "close" button 116 for closing the log image generation setting picture 110 are also displayed.

The manager selects one of the "OCR" button 111, the "printing" button 112, and the "speed priority" button 113 as a button suitable for his or her intention and then selects one of the resolution buttons 114 in the log image generation setting picture 110. After depressing the "confirmation/ change" button 115, the manager depresses the "close" button 116 to close the log image generation setting picture 110, whereupon the settings made on the log image generation setting picture 110 become effective. The control section 20 stores the thus-determined log image generation setting information in the storage device 24 and causes a transition from the manager setting mode to an ordinary mode.

(2) Generation of Job Log and Log Images

If a user sets a job and gives an instruction to carry out the job by manipulating the manipulation and display section 21 of the multifunction machine 2, the control section 20 carries out the job by controlling the individual sections of the multifunction machine 2. When the job is started, the job management section 25 issues a multifunction machine ID and a job ID and starts to manage the job using the multifunction machine ID and the job ID.

The job log generation/accumulation section 250 of the job management section 25 generates and stores a job log after the end of execution of the job. The log image generation section 251 generates log images by subjecting images handled by the job to image processing that conforms to the log image generation setting information that is stored in the storage device 24.

FIG. 7 is for description of a log image generation method.

(a) Case of Selection of OCR Button

If the "OCR" button 111 and one of the resolution buttons 114 are selected in the log image generation setting picture 110, as shown in FIG. 7 the log image generation section 251 performs image processing corresponding to an image type (FAX data, black-and-white copy data, or color scanning data) and the specified resolution. The image type can be judged from the job log.

If the resolution button 114 of "200 dpi," for example, is selected, the log image generation section 251 converts an original image into a log image having the resolution 200 dpi and performs image processing for increasing the character recognition rate, examples of which are filtering such as test mode edge emphasis or processing of converting black-and-white data (binary data) into gray scale data (multi-valued data). Where the "OCR" button 111 is selected, a high resolution (e.g., 200 dpi) that can reduce the amount of information but does not lower the character recognition rate to a large extent may be selected automatically. An alternative method for selecting a resolution is as follows. A lowest resolution for securing a certain level of character recognition rate is set in advance. If the "OCR" button 111 is selected in the log image generation setting picture 110 of FIG. 6, the picture 110 is changed so as to prevent selection of resolutions that are lower than the lowest resolution from the options of the resolution buttons 114.

(b) Case of Selection of Printing Button

If the "printing" button 112 and one of the resolution buttons 114 are selected in the log image generation setting picture 110, as shown in FIG. 7 the log image generation section 251 performs image processing corresponding to an image type and the specified resolution. The image type can be judged from a job log.

If the resolution button 114 of "200 dpi," for example, is selected, the log image generation section 251 converts an original image into a log image having the resolution 200 dpi and performs image processing for adjusting the log image so that it will be suitable for a prescribed sheet size at the time of printing. For example, the log image generation section 251 performs window size processing such as white margin addition, size cutting, or PDF (portable document format) processing. Where the "printing" button 112 is selected, a high resolution (e.g., 200 dpi) which can reduce the amount of information but does not lower the visual character recognition rate to a large extent at the time of printing may be selected automatically.

A specific example of the image processing is as follows. Since the size of original data of copying or printing may be decreased by print margins (usually about 4 mm on both sides), the log image is adjusted by white margin addition so as to be suitable for a prescribed sheet size.

The length of original data of facsimile in the main scanning direction is greater than the corresponding length of a primary sheet such as the A4 letter sheet, and the length in the auxiliary direction may also be different from the corresponding length of the prescribed sheet. Therefore, if an image is reduced simply by resolution conversion, A4-sheet data may be printed on a B4 sheet. In view of this, where original data are facsimile data, processing (size cutting or white margin addition) of adjusting the log image so that it become suitable for a common sheet size for printing is performed.

Where a log image is generated in a format such as PDF capable of specifying image data and a display position, the log image may be corrected so as to be suitable for a sheet without performing white margin addition or size cutting.

(c) Case of Selection of Speed Priority

If the "speed priority" button 113 and one of the resolution buttons 114 are selected in the log image generation setting picture 110 and if the resolution of an original image is the same as, close to, or lower than the selected resolution (e.g., 100 dpi), the original image is used as a log image.

The job management section 25 stores the log image generated by the log image generation section 251 in the log image storage section 252 in such a manner that it is correlated with a job log.

(3) Transfer of Job Log and Log Images

The control section 20 transfers the job log and the log images to the job log management server 4 via the network communication section 26 and the network 3 with prescribed timing such as an instant of application of power to the multifunction machine 2. The control section 41 of the job log management server 4 receives, via the communication section 40, the job log and the log images that are transferred from the multifunction machine 2, and stores the job log and the log images in the storage device 42 in such a manner that they are correlated with each other. The job log and the log images will be used for job management by the manager.

(4) Setting of Job Log Management Server by Manager

The manager inputs a password by manipulating the input section 43 of the job management server 4. If the manager is authenticated as a regular one, a manager setting mode is established. The manager selects an item "OCR setting" in a menu picture being displayed on the display section 44 by manipulating the input section 43 and thereby causes the display section 44 to display an OCR setting picture.

Figure 8:
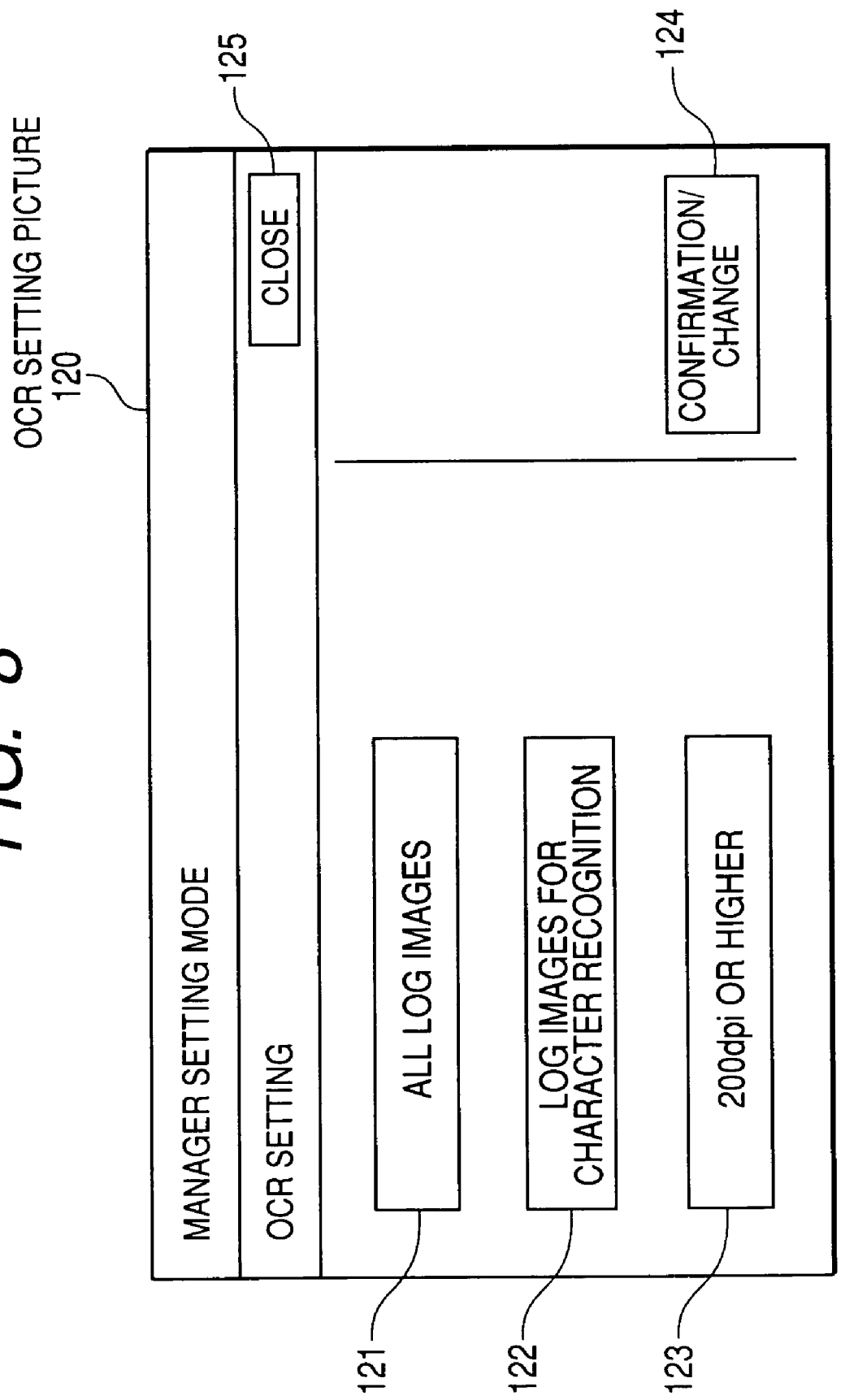
FIG. 8 shows an exemplary OCR setting picture which is displayed in the job log management server according to the second embodiment.

FIG. 8 shows the OCR setting picture. This picture 120 includes buttons 121, 122, and 123 for selecting log images to be subjected to character recognition, a "confirmation/change" button 124 for confirming or changing a setting(s), and a "close" button 125 for closing the OCR setting picture 120. The "all log images" button 121 is to employ all log images as subjects of character recognition. The "log images for character recognition" button is to employ, as subjects of character recognition, log images that were generated as ones to be subjected to character recognition. The "200 dpi or higher" button 123 is to employ as subjects of character recognition, log images whose resolution is 200 dpi or higher.

The manager selects one button suitable for his or her intention from the buttons 121, 122, and 123 and depresses the "confirmation/change" button 124 in the OCR setting picture 120. The manager than depresses the "close" button to close the OCR setting picture 120, whereupon the setting made on the OCR setting picture 120 become effective. The control section 41 stores the OCR setting information in the storage device 42 and causes a transition from the manager setting mode to an ordinary mode.

(5) Execution of Character Recognition

If the manager gives an instruction to perform character recognition by manipulating the input section 43, the control section 41 causes the character recognition section 45 to perform character recognition processing on log images. More specifically, the character recognition section 45 performs character recognition processing on log images stored in the storage device 42 according to the OCR setting information stored in the storage device 42, and stores character recognition results in the storage device 42 in such a manner that they are correlated with a job log and the log images. The job log, the log images, and the character recognition results will be used for job management by the manager.

Other Embodiments

The invention is not limited to the above embodiments, and various modifications are possible without departing from the spirit and scope of the invention. Further, components of the embodiments can be combined in a desired manner without departing from the spirit and scope of the invention.

One modification is as follows. Log image generation conditions are set in the management server 4 and each multifunction machine 2 generates log images according to the thus-set log image generation conditions. This makes it unnecessary for a manager to perform setting manipulations on each multifunction machine 2, and hence reduces the load on the manager.

The log image generation section 251 may generate log images on the basis of an electronic instruction document in which job details and log image generation conditions are written or data obtained by the image reading section 22's optically reading a like instruction document written on a sheet.

Although in the above embodiments a job log and log images are stored in the management server 4, they may be stored in the multifunction machine 2 or an external storage device instead of the management server 4. A job log and log images may be stored in different devices.

Character recognition in the management server 4 may be performed automatically by a manager's making necessary settings in advance. Or character recognition processing itself may be performed in each multifunction machine 2.

A thumbnail image may be generated which consists of plural log images. This allows a user to quickly recognize image contents of respective log images.

According to the embodiments, the generation step may comprise a processing step of generating the log images by performing processing of decreasing an amount of information of the images handled by the job. According to this configuration, a large-capacity storage device for storing log images is not necessary. Further, where log images are transferred to an external device via a network, the load on the network can be reduced.

According to the embodiments, the processing step may lower a resolution of the images handled by the job. In this case, a resolution of the log images may be such as to enable character recognition processing on the log images or to enable visual character recognition on the log images printed on sheets. The accuracy of a leakage document search can be increased by utilizing character recognition results.

According to the embodiments, the processing step may select, from plural images, one or more images as images for which log images should be generated, if the plural images have been handled by the job. This measure makes it possible to decrease the amount of information of log images.

According to the embodiments, the processing step may select, as images for which log images should be generated, images of pages specified by a specifying manipulation.

According to the embodiments, the processing step may select, as images for which log images should be generated, images of randomly specified pages. Since pages for which log images should be generated are not fixed, this measure provides the same effect of preventing leakage of secret information as in the case of generating log images for all pages.

According to the embodiments, the processing step may convert the images handled by the job into images expressed in a lower number of colors or gray scale images if the images handled by the job are color images. This measure makes it decrease the amount information of log images.

According to the embodiments, the generation step may comprise a processing step of generating the log images by subjecting the images handled by the job to image processing that is suitable for a use of the log images.

According to the embodiments, the processing step may subject the images handled by the job to image processing which increases a character recognition rate if the use is a use in character recognition processing.

According to the embodiments, the processing step may subject the images handled by the job to such image processing that the images handled by the job become suitable for a prescribed sheet size if the use is a use in printing.

According to the embodiments, the generation step may generate log images using an instruction document in which log image generation conditions are written. This measure facilitates a manipulation for setting log image generation conditions.

The term "job" is not limited to a single job and includes a job flow consisting of plural jobs. In the case of a job flow, since plural jobs handle a common image, a log image is generated for the common image. The term "image handled by a job" includes an image being processed in the job and an image obtained at the end of the job. An exemplary method for storing log images in such a manner that they are correlated with a job log is that each log image is stored so as to be correlated with a job ID and an ID of the apparatus that generates the job logs.

The term "external apparatus" includes a management server which manages one or more image processing apparatus and an external storage device.

The term "image processing apparatus" includes machines having a single function such as a copier, a printer, a scanner, and a facsimile machine, a multifunction machine having plural functions such as copying, printing, scanning, and facsimile, and a system as a combination from a copier, a printer, a scanner, a facsimile machine, etc.

What is claimed is:

1. A storage medium readable by a computer, the storage medium storing a program of instructions executable by the computer to perform a function for managing a job log, the function, comprising:
   creating a job log after execution of a job;
   generating a log image from an image handled by the job; and
   storing the log image in association with the job log,
   wherein the log image is generated by decreasing an amount of information of the image.

2. A storage medium readable by a computer, the storage medium storing a program of instructions executable by the computer to perform a function for managing a job log, the function, comprising:
   creating a job log after execution of a job;
   generating a log image from an image handled by the job; and
   transferring the job log and the log image,
   wherein the log image is generated by decreasing an amount of information of the image.

3. The storage medium according to claim 1, wherein when the amount of information of the image is decreased, the log image is generated by making a resolution of the image lower.

4. The storage medium according to claim 3, wherein, a resolution of the log image is made lower so that a character recognition processing on the log image is performable.

5. The storage medium according to claim 3, wherein, a resolution of the log image is made lower so that a visual character recognition on the log image printed on a sheet is performable.

6. The storage medium according to claim 1, wherein, when the amount of information of the image is decreased, at least one image is selected from plural images in case that the plural images are handled by the job.

7. The storage medium according to claim 6, wherein an image of page specified by a specifying instruction is selected as the log image.

8. The storage medium according to claim 6, wherein an image of randomly specified page is selected as the log image.

9. The storage medium according to claim 1, wherein, when the amount of information of the image is decreased, the image handled by the job is converted into an image expressed in a lower number of colors or gray scale image in case that the image handled by the job is a color image.

10. A storage medium readable by a computer, the storage medium storing a program of instructions executable by the computer to perform a function for managing a job log, the function, comprising:
    creating a job log after execution of a job;
    generating a log image from an image handled by the job; and
    storing the log image in association with the job log,
    wherein, the log image is generated while performing an image processing to the image handled by the job, the image processing is suitable for a way of use of the image log.

11. The storage medium according to claim 10, wherein, when the image log is to be character recognition processed, the image processing includes increasing a character recognition rate.

12. The storage medium according to claim 10, wherein, when the image log is to be printed, the image processing includes a processing suitable for a prescribed sheet size.

13. A storage medium readable by a computer, the storage medium storing a program of instructions executable by the computer to perform a function for managing a job log, the function, comprising:
    creating a job log after execution of a job;
    generating a log image from an image handled by the job; and
    storing the log image in association with the job log,
    wherein, the log image is generated by using an instruction document in which a log image generation condition is written.

14. A job log management method comprising:
    creating a job log after execution of a job;
    generating a log image from an image handled by the job; and
    storing the log image in association with the job log,
    wherein the log image is generated by decreasing an amount of information of the image.

15. A job log management method comprising:
   creating a job log after execution of a job;
   generating a log image from an image handled by the job; and
   transferring the job log and the log image,
   wherein the log image is generated by decreasing an amount of information of the image.

16. An image processing apparatus comprising:
   a job execution unit that executes a job;
   a job log creating unit that creates a job log after execution of the job;
   a log image generating unit that generates a log image from an image handled by the job; and
   a storage unit that stores the log image in association with the job log,
   wherein information of the log image is less than information of the image.

17. An image processing apparatus comprising:
   a job execution unit that executes a job;
   a job log creating unit that creates a job log after execution of the job;
   a log image generating unit that generates a log image from an image handled by the job; and
   a transfer unit that transfers the job log and the log image to an external device and causes the log image and the job log to be stored in the external device in association with each other,
   wherein information of the log image is less than information of the image.

18. An image processing system comprising:
   a job execution unit that executes a job;
   a job log creating unit that creates a job log after execution of the job;
   a log image generating unit that generates a log image from an image handled by the job; and
   a storage unit that stores the job log and the log image in association with each other,
   wherein information of the log image is less than information of the image.

* * * * *